United States Patent
Ikeda et al.

(10) Patent No.: US 6,504,584 B2
(45) Date of Patent: *Jan. 7, 2003

(54) TABLET INTEGRATED LIQUID CRYSTAL DISPLAY APPARATUS WITH LESS PARALLAX

(75) Inventors: Naoyasu Ikeda, Tokyo (JP); Eishi Mizobata, Tokyo (JP); Yoshihiko Hirai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/846,257

(22) Filed: May 2, 2001

(65) Prior Publication Data

US 2001/0020986 A1 Sep. 13, 2001

Related U.S. Application Data

(62) Division of application No. 09/393,025, filed on Sep. 9, 1999, now Pat. No. 6,295,101, which is a division of application No. 08/778,268, filed on Jan. 2, 1997, now Pat. No. 5,995,172.

(51) Int. Cl.$^7$ ........................ G02F 1/1368; G02F 1/137; G02F 1/1333
(52) U.S. Cl. ........................... 349/12; 349/139; 349/158; 349/165; 349/122
(58) Field of Search ........................... 349/12, 113, 122, 349/139, 138, 155, 156, 158, 165; 178/18, 19; 345/104, 173, 176, 179, 182

(56) References Cited

U.S. PATENT DOCUMENTS

| 4,682,858 A | 7/1987 | Kanabe et al. |
| 4,723,836 A | 2/1988 | Kono et al. |
| 4,853,498 A | 8/1989 | Meadows et al. |
| 5,612,803 A | * 3/1997 | Yamada et al. ............. 349/188 |
| 5,659,332 A | 8/1997 | Ishii et al. |
| 5,677,744 A | 10/1997 | Yoneda et al. |
| 5,729,319 A | 3/1998 | Inou et al. |
| 5,754,260 A | * 5/1998 | Ooi et al. ................... 349/139 |
| 5,774,107 A | 6/1998 | Inou |
| 6,069,675 A | * 5/2000 | Mizobata et al. ............. 349/12 |

FOREIGN PATENT DOCUMENTS

| JP | 55-157722 | 12/1980 |
| JP | 3-294918 | 12/1991 |
| JP | 4195624 | 7/1992 |
| JP | 4-238322 | 8/1992 |
| JP | 4-301621 | 10/1992 |
| JP | 5-188359 | 7/1993 |
| JP | 6-186555 | 7/1994 |

* cited by examiner

Primary Examiner—William L. Sikes
Assistant Examiner—Tai Duong
(74) Attorney, Agent, or Firm—Whitham, Curtis & Christofferson, PC

(57) ABSTRACT

In a tablet integrated type liquid crystal display apparatus, a first transparent substrate is provided on a view side. The first substrate is a plastic substrate having a thickness equal to or thinner than 0.6 mm, and a counter electrode is formed on the first substrate. A second substrate on which a driving layer composed of switching elements and pixel electrodes respectively connected to the switching elements is formed. The second substrate is a glass substrate having a thickness in a range of 0.6 mm to 1.1 mm. A guest host liquid crystal layer sandwiched by the first substrate and the second substrate such that the guest host liquid crystal is driven by a voltage applied between the counter electrode and the pixel electrode. A tablet electrode layer may be provided between the first substrate and the counter electrode.

2 Claims, 8 Drawing Sheets

TABLET INTEGRATED LIQUID CRYSTAL DISPLAY APPARATUS WITH LESS PARALLAX

CROSS REFERENCE TO RELATED APPLICATIONS

This application is a divisional application of patent application Ser. No. 09/393,025, filed Sep. 9, 1999 now issued as U.S. Pat. No. 6,295,101 which is a divisional application of U.S. Ser. No. 08/778,268, filed Jan. 2, 1997 now U.S. Pat. No. 5,995,172.

BACKGROUND OF THE INVENTION

1. Field of the Invention

The present invention relates to a liquid crystal display apparatus and more particularly to a tablet integrated liquid crystal display apparatus in which a tablet input apparatus and a liquid crystal display apparatus are integrated.

2. Description of Related Art

The apparatus that a tablet input apparatus and a display apparatus are unified is known as an input apparatus to input an instruction or data to a computer. In this apparatus, the instruction or data is inputted by directly touching the tablet input apparatus.

For example, as shown in FIG. 1, a display apparatus 12 and a tablet 13 are formed independently, and they are made as a unitary apparatus. In this example, as a display apparatus, a liquid crystal display apparatus is used, and as a tablet, a resistive film type tablet is used in which a small gap is provided between two resistive film sheets connected to a power supply and current flowing when an input pen 1 is used to contact the two resistive film sheets each other is detected so that the contact position is detected.

Next, FIG. 2 is a cross sectional view illustrating the structure of the tablet integrated type liquid crystal display apparatus shown in FIG. 1. In FIG. 2, a reference numeral 15 is a tablet, 16 and 17 are a set of polarizers, 18 and 19 are an opposing glass substrate and a thin film transistor (TFT) glass substrate, and 20 is a twisted nematic type (hereinafter, to be referred to as a "TN type") liquid crystal. A reference numeral 21 is a backlight which functions as a light source.

In a conventional active matrix driving type liquid crystal display apparatus, glass substrates having the thickness of about 0.6 to 1.1 mm are used as the substrates which sandwich the liquid crystal. Therefore, there is a problem in that the conventional liquid crystal display apparatus is heavy because the thick glass substrate is used. However, it is difficult to make the thickness of the glass substrate thin in the viewpoint of mechanical strength.

On the other hand, in a case where a pen input type screen input apparatus is combined with such a liquid crystal display apparatus, when an instruction or data is inputted by contacting the input pen 14 with the screen input apparatus, there is a problem in that the thickness of the viewing-side glass substrate directs a parallax between a tip of an input pen 14 and a liquid crystal display image so that it is not easy to input the instruction or data. In order to eliminate the parallax, if film substrates having the thickness of about 0.1 mm are used, when a film is deposited on the substrate on which switching elements are formed, there is a case that the substrate bends due to stress because the substrate is thin. Also, there is another problem in that the substrate is bent on handling it so that the switching elements are damaged.

Generally, in a display apparatus using a TN liquid crystal, when the layer width of the TN liquid crystal is changed due to external force, the angle of torsion of the TN liquid crystal is changed at the portion where the external force is applied, such that the transmissivity remarkably changes. Therefore, in a case where a tablet integrated liquid crystal display apparatus is fabricated to have the structure shown in FIG. 2 using the TN liquid crystal, there is a problem in that, when the input pen 14 is pushed to the tablet 15 for input of an instruction or data, the layer width of the TN liquid crystal is changed at the portion where the input pen 14 is pushed and the peripheral portion, so that the transmissivity changes there. As a result, the display quality is degraded there.

In order to solve this problem, as shown in FIG. 3, a method is known in which a transparent glass or plastic protecting board 23 is inserted between the tablet 15 and the liquid crystal display apparatus 22 to prevent influence to the liquid crystal display apparatus 22 due to the force by the input pen 14. However, in order to prevent the layer width of the liquid crystal in the display apparatus 22 in a case of using this method, it is necessary that the protecting board 23 is not deformed due to the pushing force. For this reason, the protecting board needs to be thick and firm. As a result, there is a problem in that the tablet integrated type liquid crystal display apparatus becomes heavy and thick. Also, because the distance between the tip of the input pen 14 and a liquid crystal display image is widened to several mm or more, there is a problem of the parallax that the image is displayed on the position which is different from the tip of the input pen 14.

SUMMARY OF THE INVENTION

Therefore, an object of the present invention is to provide a tablet integrated type liquid crystal display apparatus in which the parallax between the tip of an input pen and a display image is eliminated without occurrence of the bending of a substrate and the damage of a switching element.

In order to achieve an aspect of the present invention, a tablet integrated type liquid crystal display apparatus includes a first transparent substrate provided on a view side, wherein the first substrate has a thickness equal to or thinner than 0.6 mm, and wherein a counter electrode is formed on the first substrate, a second substrate on which a driving layer composed of switching elements and pixel electrodes respectively connected to the switching elements is formed, and guest host liquid crystal layer sandwiched by the first substrate and the second substrate such that the guest host liquid crystal is driven by a voltage applied between the counter electrode and the pixel electrode.

In the tablet integrated type liquid crystal display apparatus, a tablet electrode layer may be provided between the first substrate and the counter electrode such that the tablet electrode layer is isolated from the counter electrode. Alternatively, a tablet electrode layer may be provided on the first substrate on an opposite side of the counter electrode. In this case, it is preferable that a protecting film is provided on the tablet electrode layer. In addition, a tablet electrode layer may be provided between the second substrate and the driving layer such that the tablet electrode layer is isolated from the driving layer.

The tablet integrated type liquid crystal display apparatus may be a transmission type or a reflection type. In case of the reflection type, the pixel electrodes functions as reflecting plates in addition to the driving of the guest host liquid crystal. Also, it is preferable that the first substrate is a plastic substrate and the second substrate is a glass substrate having a thickness in a range of 0.6 mm to 1.1 mm.

In order to achieve another aspect of the present invention, a tablet integrated type liquid crystal display apparatus includes a first transparent substrate provided on a view side, wherein a counter electrode is formed on the first substrate, a second substrate on which a driving layer composed of switching elements and pixel electrodes respectively connected to the switching elements is formed, a plurality of insulative supports provided between the first substrate and the second substrate to prevent the first substrate from being bent, and liquid crystal layer sandwiched by the first substrate and the second substrate such that the liquid crystal is driven by a voltage applied between the counter electrode and the pixel electrode.

DESCRIPTION OF THE PREFERRED EMBODIMENTS

Next, the tablet integrated type liquid crystal display apparatus of the present invention will be described with reference to the accompanying drawings.

Figure 1:
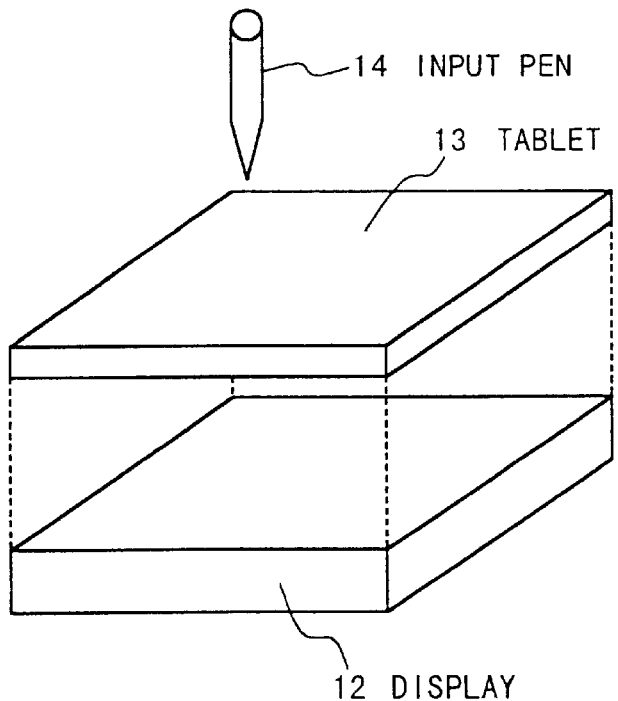
FIG. 1 is a perspective view of a conventional tablet integrated type liquid crystal display apparatus before assembly.
Figure 2:
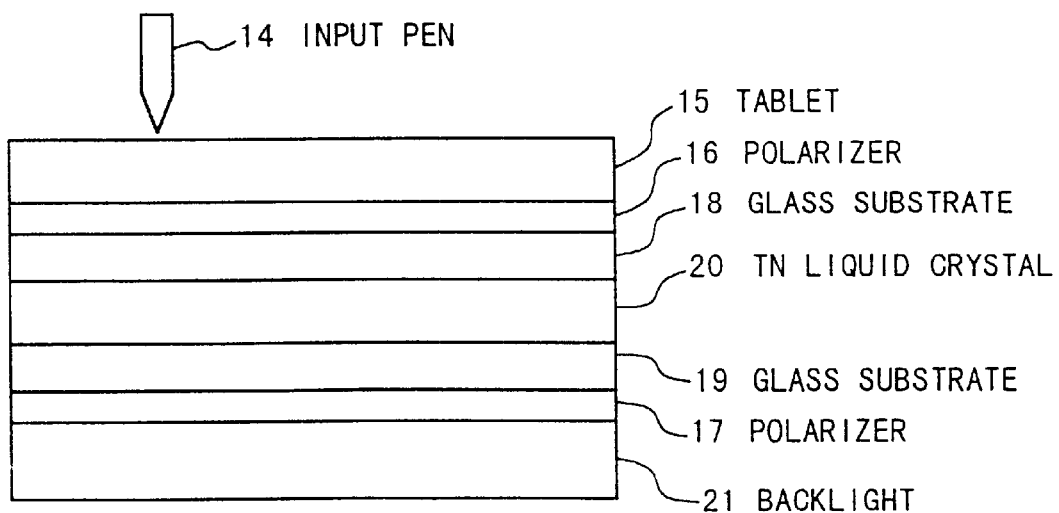
FIG. 2 is a cross sectional view of the tablet integrated type liquid crystal display apparatus shown in FIG. 1.
Figure 3:
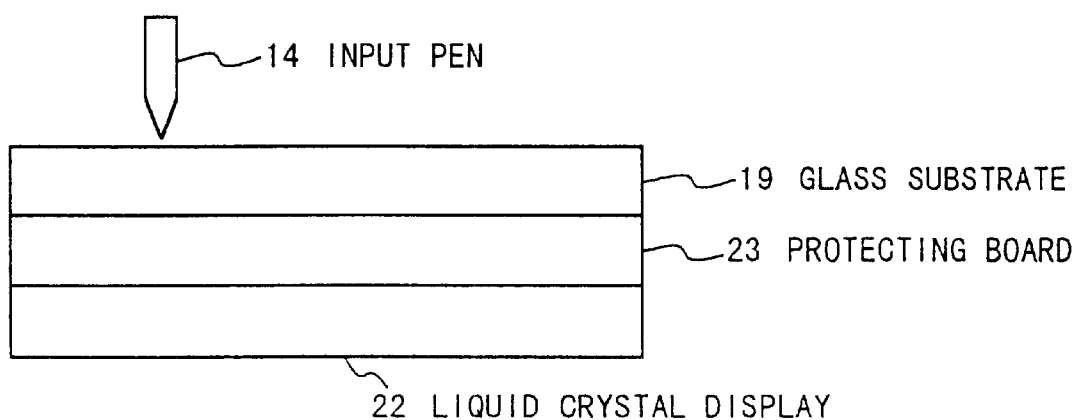
FIG. 3 is a cross sectional view illustrating the structure of a modification of the tablet integrated type liquid crystal display apparatus shown in FIG. 1.
Figure 4:
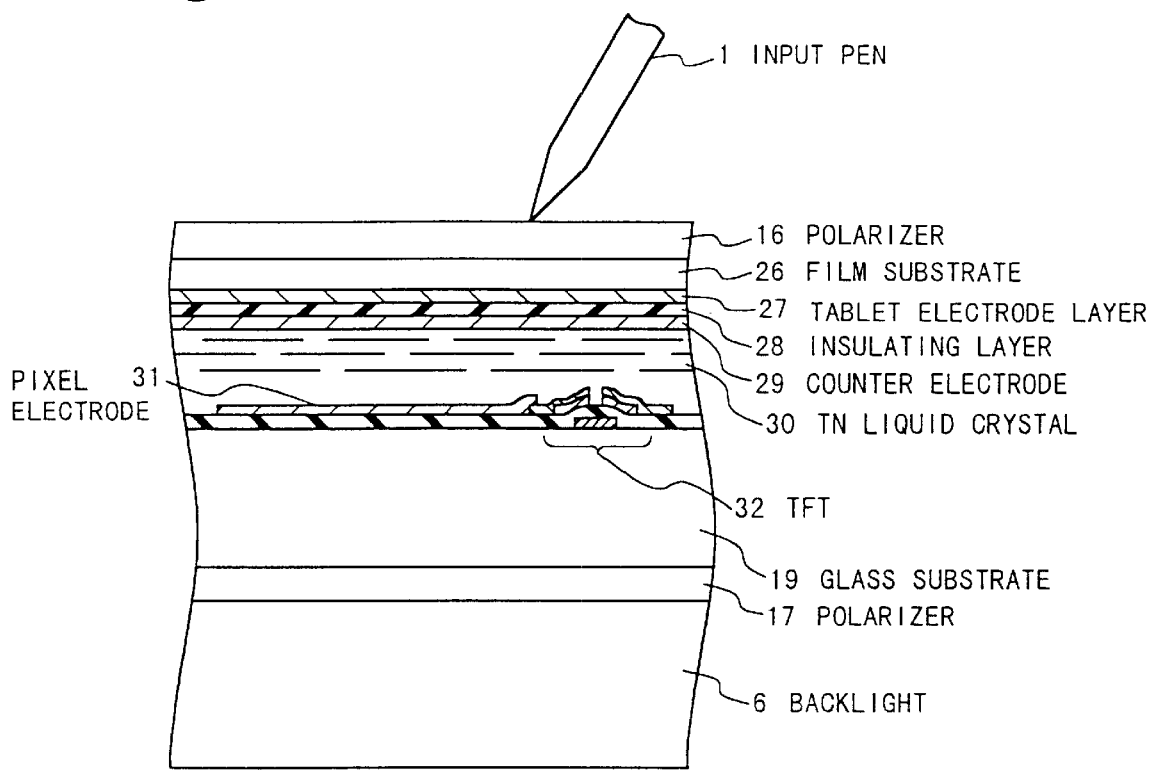
FIG. 4 is a cross sectional view illustrating the structure of a tablet-integrated-type liquid crystal display apparatus according to the first embodiment of the present invention in which a transmission type, TN liquid crystal type, TFT driving type, and active matrix type liquid crystal display apparatus is used.

First, a tablet integrated type liquid crystal display apparatus according to the first embodiment of the present invention will be described. FIG. 4 is a cross sectional view of the structure of the tablet integrated type liquid crystal display apparatus in the first embodiment. In the first embodiment, a twisted nematic (TN) liquid crystal is used for a transmission type display apparatus. The TN liquid crystal is driven by thin film transistors (TFTs) in an active matrix system.

Referring to FIG. 4, a TFT substrate 19 is composed of a glass substrate having the thickness of 0.6 to 1.1 mm. On a surface of the TFT substrate 19, a plurality of gate bus lines and a plurality of drain bus lines are arranged in a lattice manner by a usual process for producing a TFT substrate. A TFT 32 as a switching device and a pixel electrode 31 are provided for each of intersections of the plurality of gate bus lines and the plurality of drain bus lines. The TFT 32 is formed by a usual method including a plasma CVD method for deposition of an amorphous silicon (a-Si) film. As a result, the TFTs 32 are provided in a matrix manner on the glass substrate 19.

A counter electrode substrate 26 is composed of a film substrate having the thickness of 0.1 mm. Polyether sulfone or polyethylene terephtalate is used as the material of the film substrate 26. The thickness of the film substrate 26 is preferably equal to or less than 0.6 mm and more preferably equal to or less that 0.2 mm. A tablet electrode layer 27 of ITO is formed on the surface of the film substrate 26 opposing the glass substrate 19. An insulating film 28 is formed on the whole surface including the tablet electrode layer 27 and then a counter electrode 29 of ITO is arranged on the insulating film 28 corresponding to the pixel electrode 31.

The TFT substrate 19 and the film substrate 26 are subjected to a rubbing process for orientation processing, after an orientating film such as polyimide is coated. Then, a spacer material is sprayed on one of the TFT substrate 19 and the film substrate 26 and a seal material is coated on an outer region other than a display region of the other. Thereafter, both of the TFT substrate 19 and the film substrate 26 are adhered each other to have a gap and then TN-type liquid crystal is poured into the gap between two substrates 19 and 26 so that a liquid crystal layer 30 is formed. The liquid crystal is driven by the counter electrode 29 and the pixel electrode 31 via the TFT 32. Thus, a liquid crystal panel is formed.

The liquid crystal panel is sandwiched by a pair of polarizers 16 and 17. A backlight 6 is provided on the side of the polarizer 17 opposing to the TFT substrate 19. A driving circuit for driving the liquid crystal 30 and a detecting circuit for detecting a position or coordinate contacted by the input pen are omitted from the figure. The operation of the driving circuit is the same as in a conventional liquid crystal display apparatus. Also, the operation of the detecting circuit is the same as in the conventional tablet apparatus. For instance, the technique disclosed in Japanese Laid Open Patent Disclosure (JP-A-Heisei 4-195624) can be applied.

In this manner, the tablet integrated type liquid crystal display apparatus is produced. In this case, the liquid crystal display apparatus is viewed from th e side of the film substrate 26.

An input pen 1 is used to input a data or instruction. A system using electrostatic capacitor coupling or electromagnetic induction between the input pen 1 and the tablet electrode layer 27 can be used for the pen input. For instance, an example of the electrostatic capacitor coupling system is described in U.S. Pat. No. 4,853,498 issued to Meadows et al. The description is incorporated herein by reference. It is desirable that another special pen input panel is not required in addition to the liquid crystal panel. However, if the film substrate 26 is used, a resistive film system may be applied to the tablet integrated type liquid crystal display apparatus, because the film substrate 26 is thin.

As described above, because the film substrate 26 is made very thin, the parallax between the tip of the input pen 1 and a display image on the display panel can be almost eliminated. Further, because the TFT is produced on the thick TFT substrate 19 opposing to the film substrate 26 which is located on the viewing side, the occurrence of bending of the substrate and damage of the TFT can be prevented.

Figure 5:
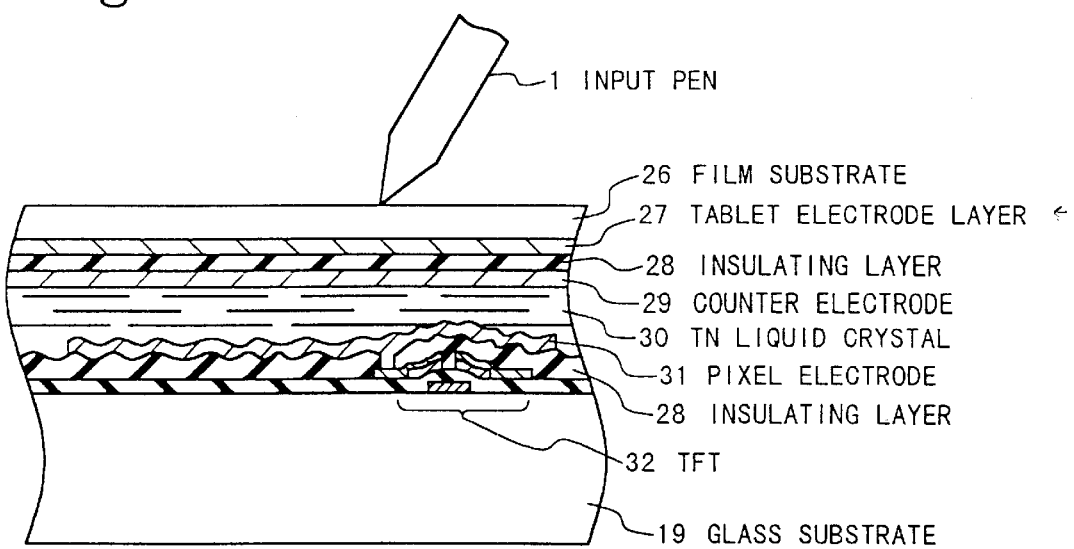
FIG. 5 is a cross sectional view illustrating the structure of a tablet-integrated-type liquid crystal display apparatus according to the second embodiment of the present invention in which a reflection type, phase-transition guest host (GH) liquid crystal type, TFT driving type and active matrix type liquid crystal display apparatus is used.

Next, a tablet-integrated-type liquid crystal display apparatus according to the second embodiment of the present invention will be described below. FIG. 5 is a cross sectional view illustrating the structure of the tablet integrate type liquid crystal display apparatus according to the second embodiment of the present invention. The liquid crystal display apparatus is a reflection type apparatus using an active matrix driving system. In the liquid crystal display apparatus, phase transit type guest host (GH) liquid crystal.

The tablet integrated liquid crystal display apparatus in the second embodiment has the structure similar to that of the first embodiment. The insulating layer 28 of polyimide is coated onto the TFT 32 array and unevenness is formed on the insulating layer 28 by a usual photoresist process. The pixel electrode 31 is formed on the insulating layer 28. The pixel electrode 31 is connected to the corresponding TFT 32 via a contact hole. Because the pixel electrode 31 is also used as a reflection plate, the pixel electrode 31 is formed of metal such as aluminum (Al). Any polarizer is not required on either side of the liquid crystal display panel because the GH liquid crystal is used. Further, the backlight is not provided because the display panel is a reflection type. The other structural portions are the same as those of the first embodiment.

As described above, in the tablet integrated type liquid crystal display apparatus in the second embodiment, because the pixel electrode 31 which is used as the reflection plate is provided in the liquid crystal panel, there is not a parallax between the reflection plate and the display image as in the conventional example. As a result, there is no case that the data or image is displayed in a floating state. Also, the parallax between the display image and the tip of the input pen 1 can be almost eliminated, as in the first embodiment. Further, the occurrence of bending of the TFT substrate 29 and damage of the elements can be prevented.

In the first and second embodiment, the TFT is used as the switching element. However, the same effect can be obtained in the active matrix driving type, and tablet integrated type liquid crystal display apparatus using a 2-terminal element such as an MIM or TFD. This is applied to the following embodiments, too.

Next, the tablet integrated type liquid crystal display apparatus according to the third embodiment of the present invention will be described. In the following description, an example in which the present invention is applied to a color liquid crystal display of 24 cm in a diagonal direction which has 640×480 RGB dots.

Figure 6:
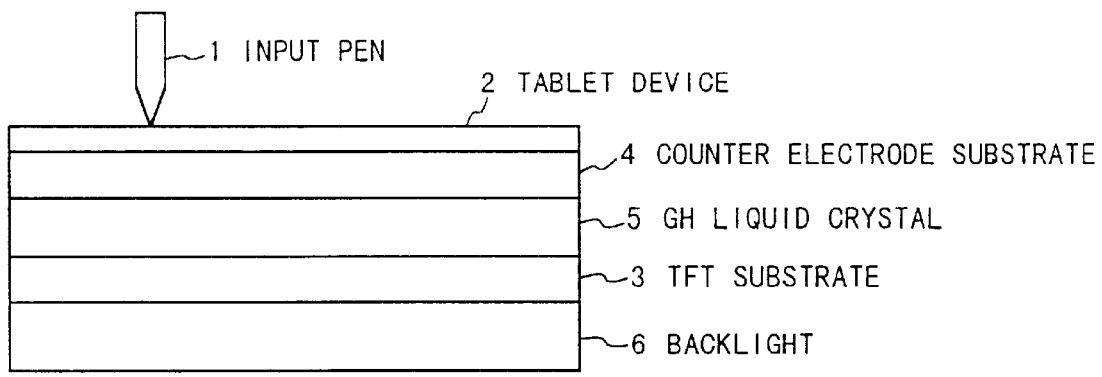
FIG. 6 is a cross sectional view illustrating a tablet integrated type liquid crystal display apparatus according to the third embodiment of the present invention.
Figure 7:
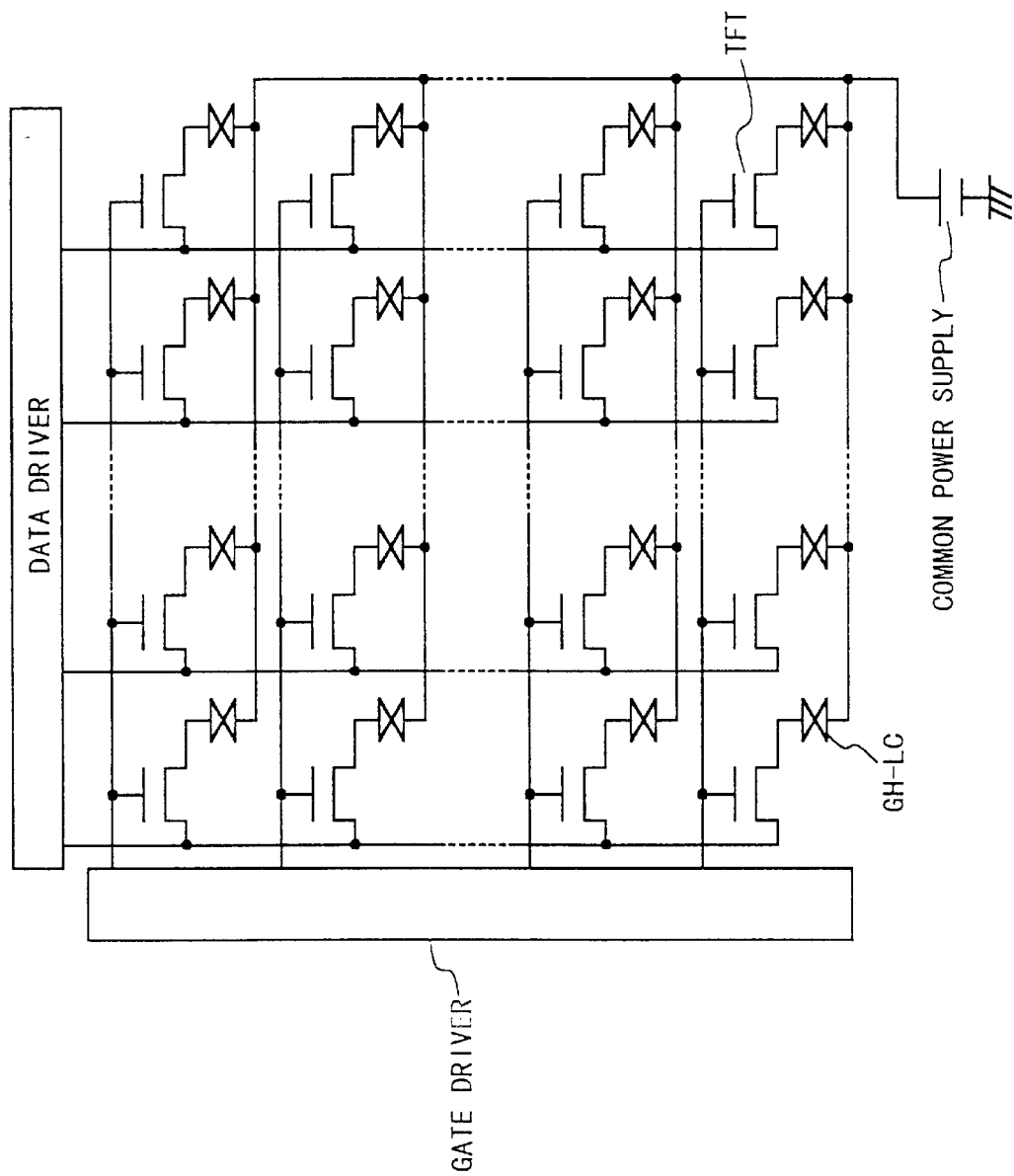
FIG. 7 is a circuit diagram illustrating the circuit of the a tablet integrated type liquid crystal display apparatus in the third embodiment.

FIG. 6 is a cross sectional view illustrating the structure of the tablet integrated type liquid crystal display apparatus in the third embodiment of the present invention. Referring to FIG. 6, a GH-type liquid crystal 5 is sandwiched by a transparent TFT substrates 3 and a transparent counter electrode substrate 4 and is sealed between them. On a surface of the TFT substrate 3 opposing to the substrate 4, 480 scanning lines, 1920 signal lines, 921600 thin film field effect transistors (TFT) and pixel electrodes are formed. On the other hand, on a surface of the substrate 4 opposing to the TFT substrate 3 with a color filter, counter electrodes of ITO are formed. Voltage is applied to the GH type liquid crystal 5 by the pixel electrode and the counter electrode via the TFT. The circuit structure of the tablet integrated type liquid crystal display apparatus in the third embodiment is shown in FIG. 7. The GH liquid crystal layer 5 is connected to the corresponding TFT, the data driver and a common power supply in series. The gate of the TFT is connected to a gate driver.

The operation principle to display an image in the third embodiment is the same as that of a conventional transmissive type active matrix driving type liquid crystal display apparatus.

A tablet device 2 is provided on the other surface of counter electrode substrate 4. On a surface of a glass substrate (not illustrated in FIG. 6) of the tablet apparatus 2, ITO electrodes (not illustrated in FIG. 6) are formed to detect a position on which input pen 1 is put. A backlight for illumination is provided on the side of the other surface of the TFT substrate 3.

On the other hand, input to the tablet device 2 is performed by making the input pen 1 contact the tablet device 2. For instance, two resistive films are made to contact with each other and the contact position is detected. In this case, the tablet device 2 and the counter electrode substrate 4 are pushed because of pushing pressure so that the gap width between the TFT substrate 3 and the counter electrode substrate 4 changes. As a result, the thickness of the GH liquid crystal layer changes. However, because the transmissivity of the GH liquid crystal does not change so much, a problem in case of practical use does not occur.

Figure 8:
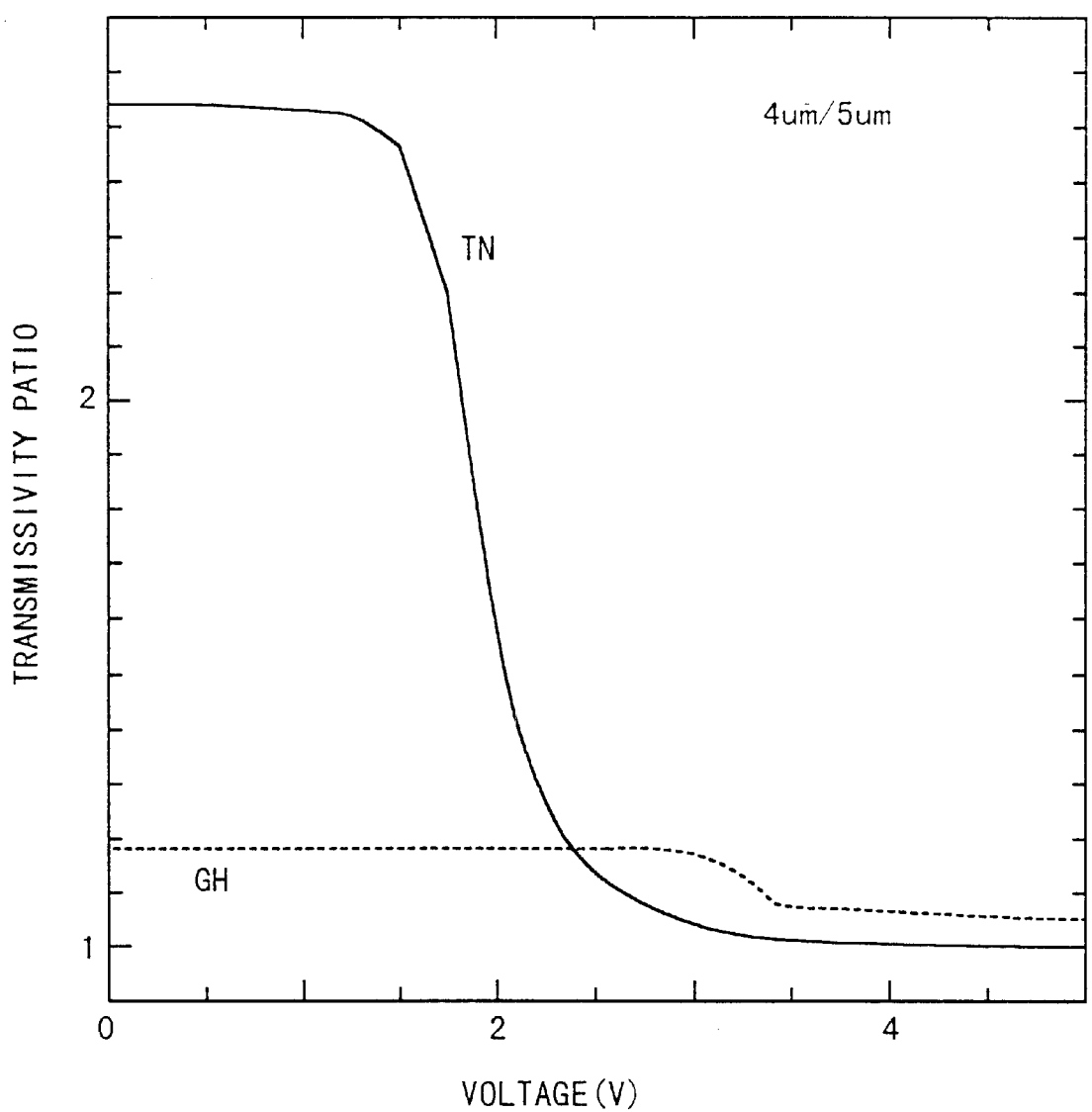
FIG. 8 is a graph showing the dependency of transmissivity of a liquid crystal layer upon voltage applied across the liquid crystal layer when the layer width of the liquid crystal layer is changed due to pushing pressure.

FIG. 8 is a graph illustrating the transmissivity change characteristics of the GH liquid crystal and the TN liquid crystal. In this graph, a solid line illustrates a simulation result of a transmissivity ratio between the case where a voltage is applied to the GH liquid crystal layer having the thickness of 5 $\mu$m and the case where the same voltage is applied to the GH liquid crystal layer having the thickness of 4 $\mu$m as the result of the pushing pressure. A dashed line illustrates a simulation result of a transmissivity ratio in the same cases. For instance, when the voltage of about 2 V is applied to the TN liquid crystal layer for a gray gradation, the display image changes greatly if the TN liquid crystal layer is changed from 5 $\mu$m to 4 $\mu$m in thickness. However, it could be seen that the display image does not change so much in the GH liquid crystal layer. The change in the transmissivity in the TN liquid crystal layer is twice in the GH liquid crystal layer. Further, the TN liquid crystal has contrast one order higher than the GH liquid crystal. Therefore, in the case of using the TN liquid crystal, the change of the display image in contrast before and after the liquid crystal panel is pushed is remarkable. However, in the tablet integrated type liquid crystal display panel using the GH liquid crystal, there is not such a problem in practice use.

In the third embodiment, an example is described in which resistive films are contacted with each other. However, the tablet device is not limited to this. For instance, electrostatic capacitive coupling between the input pen 1 and the transparent ITO electrode may be used for detection of a coordinate in the tablet device 2. Alternatively, it is possible to apply to the tablet device the method which detects a coordinate using the electromagnetic coupling between the input pen 1 and the tablet device 2. In this case, the tablet device 2 is preferably provided rear the backlight 6.

Next, the tablet integrated type liquid crystal display apparatus according to the fourth embodiment will be described below. In the following description, an example in which the present invention is applied to a color liquid crystal display of 24 cm in a diagonal direction which has 640×480 RGB dots.

Figure 9:
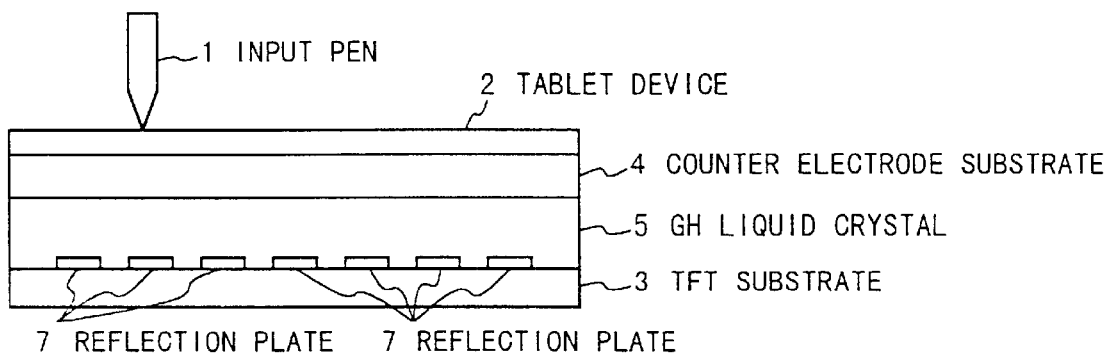
FIG. 9 is a cross sectional view illustrating a tablet integrated type liquid crystal display apparatus according to the fourth embodiment of the present invention.

FIG. 9 is a cross sectional view illustrating the structure of the tablet integrate type liquid crystal display apparatus in the fourth embodiment of the present invention. Referring to FIG. 9, a GH-type liquid crystal 5 is sandwiched by a transparent TFT substrates 3 and a transparent counter electrode substrate 4 and is sealed between them. On a surface of the TFT substrate 3 opposing to the substrate 4, 480 scanning lines, 1920 signal lines, 921600 thin film field effect transistors (TFT) and pixel electrodes are formed. The pixel electrodes are connected to the corresponding to the TFTs. Reflection plates 7 of aluminum are provided above the pixel electrodes 7. On the other hand, on a surface of the substrate 4 opposing to the TFT substrate 3 with a color filter, counter electrodes of ITO are formed. Voltage is applied to the GH type liquid crystal 5 by the pixel electrode and the counter electrode via the TFT.

A tablet device 2 is provided on the other surface of counter electrode substrate 4. On a surface of a glass substrate (not illustrated) of the tablet apparatus 2, an ITO electrodes (not illustrated) are formed to detect a position on which an input pen 1 is put. Because the liquid crystal display apparatus is a reflection type, any backlight 6 is not provided on the side of the other surface of the TFT substrate 3.

The operation principle to display an image in the third embodiment is the same as that of a conventional transmissive type active matrix driving type liquid crystal display apparatus.

On the other hand, input to the tablet device 2 is performed by making the input pen 1 contact the tablet device 2. In this case, the tablet device 2 and the counter electrode substrate 4 are pushed because of pushing pressure so that the gap width between the TFT substrate 3 and the counter electrode substrate 4 changes. As a result, the by thickness of the GH liquid crystal layer changes. However, because the transmissivity of the GH liquid crystal does not change so much, a problem in case of practical use does not occur, as described above.

In the fourth embodiment, an example is described in which there may be used the method which detects a coordinate from the change of the resistance value when an electrode is pressed. However, the tablet device is not limited to this. Alternatively, electrostatic capacitive coupling between the input pen 1 and the transparent ITO electrode may be used for detection of a coordinate in the tablet device 2. Also, it is possible to apply to the tablet device the method which detects a coordinate using the electromagnetic coupling between the input pen 1 and the tablet device 2. In this case, the tablet device 2 is preferably provided rear the TFT substrate 3.

Next, the tablet integrated type liquid crystal display apparatus according to the fifth embodiment of the present invention will be described. In the following description, an example in which the present invention is applied to a color liquid crystal display of 24 cm in a diagonal direction which has 640×480 RGB dots.

Figure 10:
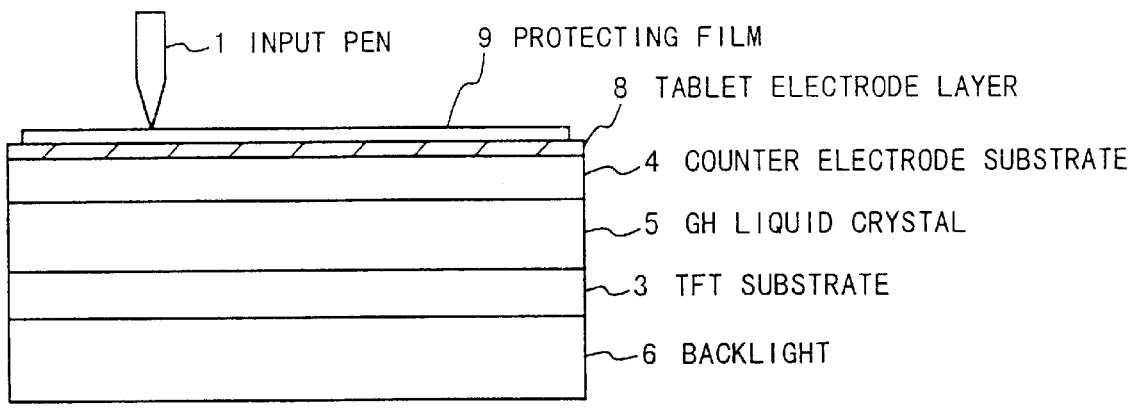
FIG. 10 is a cross sectional view illustrating a tablet integrated type liquid crystal display apparatus according to the fifth embodiment of the present invention.

FIG. 10 is a cross sectional view illustrating the structure of the tablet integrated type liquid crystal display apparatus in the fifth embodiment of the present invention. Referring to FIG. 10, a GH type liquid crystal 5 is sandwiched by a transparent TFT substrates 3 and a transparent counter electrode substrate 4 and is sealed between them. On a surface of the TFT substrate 3 opposing to the substrate 4, 480 scanning lines, 1920 signal lines, 921600 thin film field effect transistors (TFT) and pixel electrodes are formed. On the other hand, on a surface of the substrate 4 opposing to the TFT substrate 3 with a color filter, counter electrodes of ITO are formed. Voltage is applied to the GH type liquid crystal 5 by the pixel electrode and the counter electrode via the TFT.

Tablet electrodes 8 of ITO are provided on the other surface of counter electrode substrate 4 to detect a position on which an input pen 1 is put. A protecting film 9 is provided on the tablet electrodes 8 to protect the tablet electrodes 8 from damage due to contact with the input pen 1. A backlight 6 for the illumination is provided on the side of the other surface of the TFT substrate 3.

The operation principle to display an image in the third embodiment is the same as that of a conventional transmissive type active matrix driving type liquid crystal display apparatus. On the other hand, input to the tablet device 2 is performed by making the input pen 1 contact the tablet device 2. In this case, the tablet device 2 and the counter electrode substrate 4 are pushed because of pushing pressure so that the gap width between the TFT substrate 3 and the counter electrode substrate 4 changes. As a result, the thickness of the GH liquid crystal layer changes. However, because the transmissivity of the GH liquid crystal does not change so much, a problem in case of practical use does not occur, as described above.

In the fifth embodiment, an example is described in which electrostatic capacitive coupling between the input pen 1 and the transparent ITO electrode is used for detection of a coordinate. However, the present invention is not limited to this, but there may be used the method which detects a coordinate from the change of the resistance value when an electrode is pressed. Also, the method may be used in which the potential of a tablet electrode 8 is detected by the input pen 1 to detect a coordinate.

Next, the tablet integrated type liquid crystal display apparatus according to the sixth embodiment will be described below. In the following description, an example in which the present invention is applied to a color liquid crystal display of 24 cm in a diagonal direction which has 640×480 RGB dots.

Figure 11:
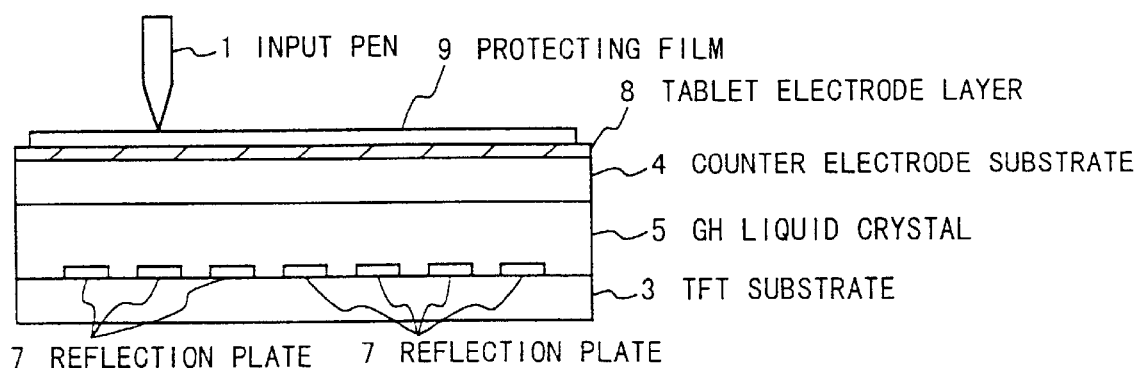
FIG. 11 is a cross sectional view illustrating a tablet integrated type liquid crystal display apparatus according to the sixth embodiment of the present invention.

FIG. 11 is a cross sectional view illustrating the structure of the tablet integrate type liquid crystal display apparatus in the sixth embodiment of the present invention. Referring to FIG. 11, a GH-type liquid crystal 5 is sandwiched by a transparent TFT substrates 3 and a transparent counter electrode substrate 4 and is sealed between them. On a surface of the TFT substrate 3 opposing to the substrate 4, 480 scanning lines, 1920 signal lines, 921600 thin film field effect transistors (TFT) and pixel electrodes are formed. The pixel electrodes are connected to the corresponding to the TFTs. Reflection plates 7 of aluminum are provided above the pixel electrodes 7. On the other hand, on a surface of the substrate 4 opposing to the TFT substrate 3 with a color filter, counter electrodes of ITO are formed. Voltage is applied to the GH type liquid crystal 5 by the pixel electrode and the counter electrode via the TFT. On the other surface of the counter electrode substrate 4, tablet electrodes 8 of ITO are provided to detect a position on which an input pen 1 is put. A protection film 9 is provided to protect the tablet electrodes 8 from damage due to contact with the input pen 1. Because the liquid crystal display apparatus is a reflection type, any backlight 6 is not provided on the side of the other surface of the TFT substrate 3.

The operation principle to display an image in the third embodiment is the same as that of a conventional transmissive type active matrix driving type liquid crystal display apparatus.

On the other hand, input to the tablet device 2 is performed by making the input pen 1 contact the tablet device 2. In this case, the tablet device 2 and the counter electrode substrate 4 are pushed because of pushing pressure so that the gap width between the TFT substrate 3 and the counter electrode substrate 4 changes. As a result, the thickness of the GH liquid crystal layer changes. However, because the transmissivity of the GH liquid crystal does not change so much, a problem in case of practical use does not occur, as described above.

In the fourth embodiment, an example is described in which electrostatic capacitive coupling between the input pen 1 and the transparent ITO electrode is used for detection of a coordinate in the tablet device 2. However, the tablet device is not limited to this, but there may be used the method which detects a coordinate from the change of the resistance value when an electrode is pressed. Also, it is possible to apply to the tablet device the method which detects a coordinate using the electromagnetic coupling between the input pen 1 and the tablet device 2. In this case, the tablet device 2 is preferably provided rear the TFT substrate 3.

Next, the tablet integrated type liquid crystal display apparatus according to the seventh embodiment will be described below. In the following description, an example in which the present invention is applied to a color liquid crystal display of 24 cm in a diagonal direction which has 640×480 RGB dots.

Figure 12:
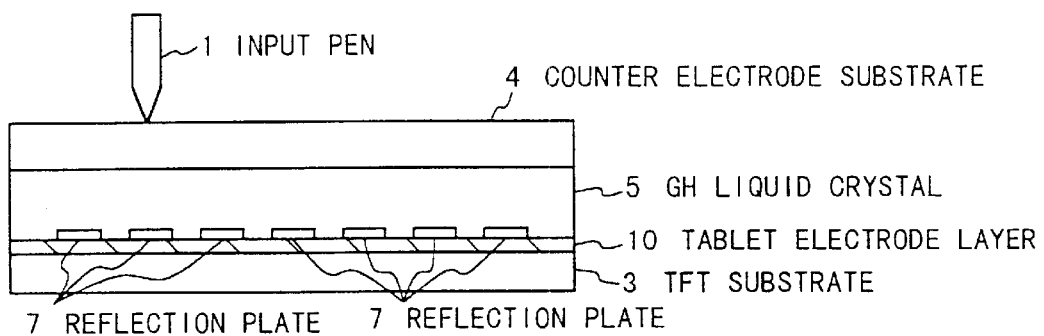
FIG. 12 is a cross sectional view illustrating a tablet integrated type liquid crystal display apparatus according to the seventh embodiment of the present invention.

FIG. 12 is a cross sectional view illustrating the structure of the tablet integrate type liquid crystal display apparatus in the seventh embodiment of the present invention. Referring to FIG. 12, a GH-type liquid crystal 5 is sandwiched by a transparent TFT substrates 3 and a transparent counter electrode substrate 4 and is sealed between them. On a surface of the TFT substrate 3 opposing to the substrate 4, tablet electrodes 10 are provided to use for detection of a coordinate pointed by the input pen 1. Above the tablet electrodes 10 via an insulating film (not shown), 480 scanning lines, 1920 signal lines, 921600 thin film field effect transistors (TFT) and pixel electrodes are formed. The pixel electrodes are connected to the corresponding to the TFTs. Reflection plates 7 of aluminum are provided above the pixel electrodes 7. On the other hand, on a surface of the substrate 4 opposing to the TFT substrate 3 with a color filter, counter electrodes of ITO are formed. Voltage is applied to the GH type liquid crystal 5 by the pixel electrode and the counter electrode via the TFT. On the other surface of the counter electrode substrate 4, a tablet device 2 is provided to detect a position on which an input pen 1 is put. Because the liquid crystal display apparatus is a reflection type, any backlight 6 is not provided on the side of the other surface of the TFT substrate 3.

The operation principle to display an image in the third embodiment is the same as that of a conventional reflection type active matrix driving type liquid crystal display apparatus.

On the other hand, input to the tablet device 2 is performed by making the input pen 1 contact the tablet device 2. In this case, the tablet device 2 and the counter electrode substrate 4 are pushed because of pushing pressure so that the gap width between the TFT substrate 3 and the counter electrode substrate 4 changes. As a result, the thickness of the GH liquid crystal layer changes. However, because the transmissivity of the GH liquid crystal does not change so much, a problem in case of practical use does not occur, as described above.

In the fourth embodiment, an example is described in which a coordinate is detected using the electromagnetic coupling between the input pen 1 and the tablet electrode 8.

Next, the tablet integrated type liquid crystal display apparatus according to the eighth embodiment of the present invention will be described. In the following description, an example in which the present invention is applied to a color liquid crystal display of 24 cm in a diagonal direction which has 640×480 RGB dots.

Figure 13:
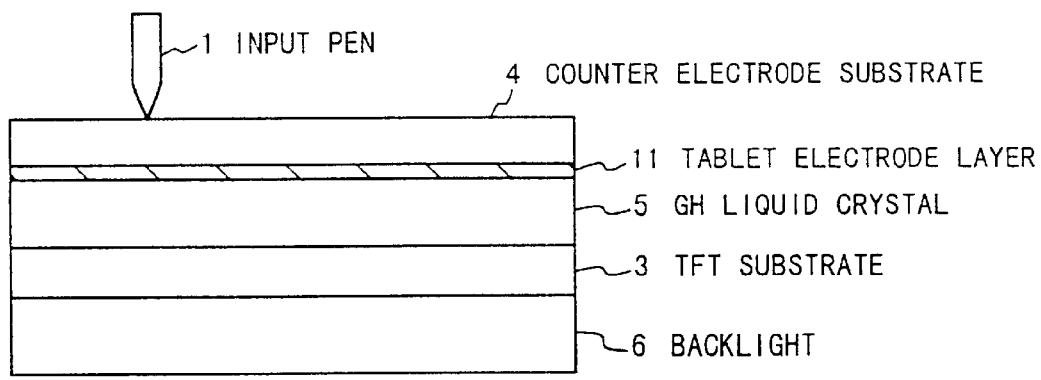
FIG. 13 is a cross sectional view illustrating a tablet integrated type liquid crystal display apparatus according to the eighth embodiment of the present invention.

FIG. 13 is a cross sectional view illustrating the structure of the tablet integrated type liquid crystal display apparatus in the eighth embodiment of the present invention. Referring to FIG. 13, a GH-type liquid crystal 5 is sandwiched by a transparent TFT substrates 3 and a transparent counter electrode substrate 4 and is sealed between them. On a surface of the TFT substrate 3 opposing to the substrate 4, 480 scanning lines, 1920 signal lines, 921600 thin film field effect transistors (TFT) and pixel electrodes are formed. On the other hand, on a surface of the substrate 4 opposing to the TFT substrate 3 with a color filter, tablet electrodes 11 are provided to detect a position on which an input pen 1 is put. Counter electrodes of ITO are formed above the tablet electrodes 11 via an insulating film. Voltage is applied to the GH type liquid crystal 5 by the pixel electrode and the counter electrode via the TFT. A backlight 6 for the illumination is provided on the side of the other surface of the TFT substrate 3.

The operation principle to display an image in the third embodiment is the same as that of a conventional transmission type active matrix driving type liquid crystal display apparatus. On the other hand, the input pen 1 is made to contact the counter electrode substrate 4. In this case, the counter electrode substrate 4 is pushed because of pushing pressure so that the gap width between the TFT substrate 3 and the counter electrode substrate 4 changes. As a result, the thickness of the GH liquid crystal layer changes. However, because the transmissivity of the GH liquid crystal does not change so much, a problem in case of practical use does not occur, as described above.

In the eighth embodiment, an example is described in which electrostatic capacitive coupling between the input pen 1 and the transparent ITO electrode is used for detection of a coordinate. However, the present invention is not limited to this, but the method may be used in which the potential of a tablet electrode 8 is detected by the input pen 1 to detect a coordinate.

Next, the tablet integrated type liquid crystal display apparatus according to the ninth embodiment of the present invention will be described. In the following description, an example in which the present invention is applied to a color liquid crystal display of 24 cm in a diagonal direction which has 640×480 RGB dots.

Figure 14:
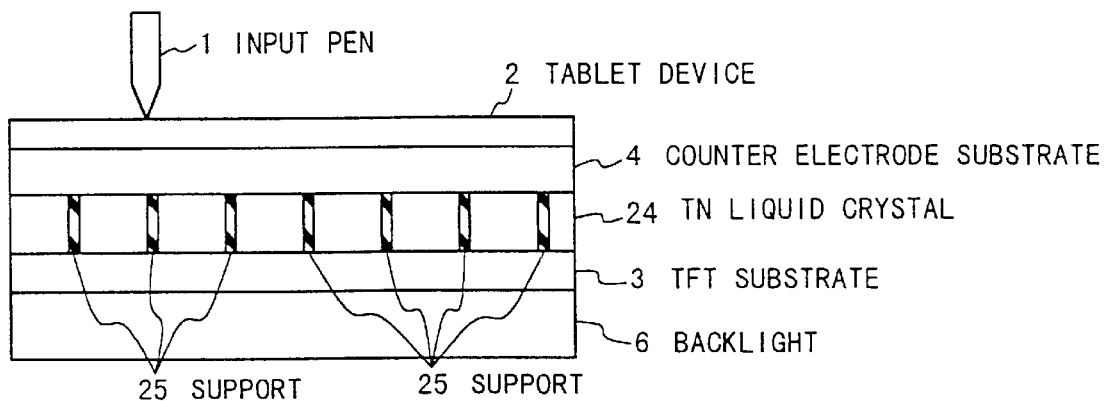
FIG. 14 is a cross sectional view illustrating a tablet integrated type liquid crystal display apparatus according to the ninth embodiment of the present invention.

FIG. 14 is a cross sectional view illustrating the structure of the tablet integrated type liquid crystal display apparatus in the ninth embodiment of the present invention. Referring to FIG. 14, a TN-type liquid crystal 24 is sandwiched by a transparent TFT substrates 3 and a transparent counter electrode substrate 4 and is sealed between them. On a surface of the TFT substrate 3 opposing to the substrate 4, 480 scanning lines, 1920 signal lines, 921600 thin film field effect transistors (TFT) and pixel electrodes are formed. On the other hand, on a surface of the substrate 4 opposing to the TFT substrate 3 with a color filter, counter electrodes of ITO are formed. Voltage is applied to the TN type liquid crystal 5 by the pixel electrode and the counter electrode via the TFT.

A tablet device 2 is provided on the other surface of the counter electrode substrate 4. A backlight 6 for the illumination is provided on the side of the other surface of the TFT substrate 3.

After the TFT substrate 3 is formed by the same method as in the conventional technique, a polyimide film is formed on it. The polyimide film is patterned into a plurality of rectangular shapes by a photo-lithography method so that a plurality of supports 25 are formed. The supports 25 are provided to avoid the pixel electrodes with the period as much as the pixel pitch.

The operation principle in the present embodiment for displaying an image is same as the case of the active matrix-type liquid crystal display apparatus of the conventional transmission type. On the other hand, input to the tablet device 2 is performed using the input pen 2. At this time, the tablet device 2 and the counter electrode substrate 4 are pushed because of pushing pressure. However, because the supports 25 are inserted between the counter electrode substrate 4 and the TFT substrate 3 with the very short period, the gap width of TN-type liquid crystal layer 24 changes hardly. Even if the change occurs, the change is within one pixel because the supports 25 are provided with the period as long as the pixel period. Therefore, a problem does not occur in case of practical use.

In the above example, the supports 25 which connect the counter electrode substrate 3 and the TFT substrate 4 are formed of the polyimide film by the photo-lithography method. However, the present invention is not limited to this. Other means may be used if a material and structure are selected such that the gap width of the liquid crystal layer is not changed because of the pushing pressure so that the display image is not degraded.

In the present embodiment, the case that the supports are rectangular was described. However, the shape of the support may be different if there is no problem in the pouring and orientation of liquid crystal. Further, it was described that the supports 25 are arranged with the period as long as the pixel pitch. However, if the change of the gap width of the liquid crystal layer is so small that the degradation of a display image is not sensitive to a user, the period may be extended or shortened. Alternatively, the supports 25 may be arranged randomly.

As described above, according to the present invention, because a protection board is not necessary which is inserted between the liquid crystal display and the tablet not to change the gap width of the liquid crystal layer, the weight of the tablet integrated type liquid crystal display apparatus can be reduced 20%.

Also, the thickness of the display apparatus can be reduced to about half of that of the conventional display apparatus. Further, because the thick protection board is not inserted between the tip and the display apparatus, it is possible to realize the display apparatus with no parallax.

Also, according to the present invention, the glass substrate is used for the TFT substrate and the plastic film substrate having the thickness equal to or less than 0.6 mm is used for the counter electrode substrate. In addition, the counter electrode substrate is arranged on the viewing side. Therefore, the parallax between the display image and the tip of the input pen input can be almost eliminated. Further, the occurrence of bending of the TFT substrate and damage of the elements such as the TFTs can be prevented.

If the present invention is applied to the personal computer display having 480×640 RGB dots, a tablet integrated type liquid crystal display apparatus can be achieved to have the resolution of about 200 μm and to reduce the weight and the thickness.

What is claimed is:

1. A liquid crystal display apparatus comprising:
   a pixel electrode substrate having a plurality of pixel electrodes arranged in a matrix;
   a counter electrode substrate having at least one electrode arranged in correspondence to said plurality of pixel electrodes; and
   a guest-host liquid crystal layer interposed between said pixel electrode substrate and said counter electrode substrate,
   wherein said pixel electrode substrate is composed of a glass substrate, and said counter electrode substrate is composed of a plastic film having a thickness equal to or less than 0.6 mm,
   said counter electrode substrate is provided on a viewer side, whereby change in transmissivity ratio with change in spacing between said counter electrode and said pixel electrode due to bending of said counter electrode substrate is limited while parallax across said counter electrode substrate is substantially eliminated, and wherein each of said plurality of pixel electrodes is composed of a metal reflection electrode.

2. The liquid crystal display apparatus according to claim 1, where said pixel electrode substrate has an insulating film with uneven portions, and said pixel electrode substrate is formed on or above said uneven portions of said insulating film.

* * * * *